(12) United States Patent
Dye

(10) Patent No.: US 12,193,986 B2
(45) Date of Patent: *Jan. 14, 2025

(54) THERAPEUTIC, FITNESS, AND SPORTS ENHANCEMENT DEVICE

(71) Applicant: Performance Solutions, LLC, Natick, MA (US)

(72) Inventor: Kipp K. Dye, Natick, MA (US)

(73) Assignee: Performance Solutions, LLC, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,691

(22) Filed: Nov. 2, 2020

(65) Prior Publication Data

US 2021/0045965 A1 Feb. 18, 2021

Related U.S. Application Data

(60) Continuation of application No. 16/375,996, filed on Apr. 5, 2019, now abandoned, which is a continuation (Continued)

(51) Int. Cl.
*A61H 15/00* (2006.01)
*A63B 21/00* (2006.01)
(Continued)

(52) U.S. Cl.
CPC ......... *A61H 15/0092* (2013.01); *A61H 15/00* (2013.01); *A63B 21/0004* (2013.01);
(Continued)

(58) Field of Classification Search
CPC ......... B29C 48/06; B29C 44/02; B29C 48/03; B29C 48/001; B29C 44/445;
(Continued)

(56) References Cited

U.S. PATENT DOCUMENTS 798,457 A 8/1905 Schmidt
1,519,631 A 12/1924 Sawtelle
(Continued)

FOREIGN PATENT DOCUMENTS

AU 654492 11/1994
CA 2109293 A1 10/1993
(Continued)

OTHER PUBLICATIONS

OPTP Shop On-Line, Orthopedic Physical Therapy Products, captured by the Wayback Machine on Apr. 8, 2005; available at: (https://web.archive.org/web/20050408055454/http://www.optp.com/shop.cfm?groupid=Foam%20Roller%20Therapy&catid=PRO%2DROLLER) Apr. 8, 2005.

(Continued)

*Primary Examiner* — Valerie L Woodward
(74) *Attorney, Agent, or Firm* — Nixon Peabody LLP

(57) ABSTRACT

A therapeutic, fitness, and sports enhancement device which includes a cylindrically shaped body having a predetermined density and predetermined diameter, the body including a plurality of projections of a predetermined shape. One or more of the predetermined density and the predetermined diameter in combination with the predetermined shape of the projections optimize mobilization of soft tissue structures of the human body.

20 Claims, 15 Drawing Sheets

Related U.S. Application Data of application No. 15/592,915, filed on May 11, 2017, now Pat. No. 10,278,890, which is a continuation of application No. 15/005,380, filed on Jan. 25, 2016, now Pat. No. 9,656,112, which is a division of application No. 13/065,850, filed on Mar. 31, 2011, now Pat. No. 9,345,921, which is a continuation-in-part of application No. 11/827,361, filed on Jul. 11, 2007, now Pat. No. 7,918,774.

(60) Provisional application No. 60/831,726, filed on Jul. 18, 2006.

(51) Int. Cl.

| | |
|---|---|
| *A63B 23/02* | (2006.01) |
| *A63B 26/00* | (2006.01) |
| *B29C 44/02* | (2006.01) |
| *B29C 44/44* | (2006.01) |
| *B29C 45/00* | (2006.01) |
| *B29C 48/00* | (2019.01) |
| *B29C 48/03* | (2019.01) |
| *B29C 48/06* | (2019.01) |
| *B29C 48/12* | (2019.01) |
| *B29C 53/40* | (2006.01) |
| *B29C 65/00* | (2006.01) |
| *B29C 65/48* | (2006.01) |
| *B29D 23/00* | (2006.01) |
| *B29K 105/04* | (2006.01) |
| *B29K 105/24* | (2006.01) |
| *B29L 23/00* | (2006.01) |
| *B29L 31/46* | (2006.01) |
| *B29L 31/52* | (2006.01) |

(52) U.S. Cl.
CPC ...... *A63B 21/4033* (2015.10); *A63B 21/4049* (2015.10); *A63B 23/02* (2013.01); *A63B 26/003* (2013.01); *B29C 44/02* (2013.01); *B29C 44/445* (2013.01); *B29C 45/00* (2013.01); *B29C 48/001* (2019.02); *B29C 48/022* (2019.02); *B29C 48/03* (2019.02); *B29C 48/06* (2019.02); *B29C 48/12* (2019.02); *A61H 2015/0014* (2013.01); *A61H 2201/169* (2013.01); *A61H 2201/1695* (2013.01); *B29C 53/40* (2013.01); *B29C 65/48* (2013.01); *B29C 66/128* (2013.01); *B29C 66/14* (2013.01); *B29C 66/4322* (2013.01); *B29C 66/45* (2013.01); *B29C 66/71* (2013.01); *B29C 66/727* (2013.01); *B29D 23/001* (2013.01); *B29K 2023/06* (2013.01); *B29K 2105/046* (2013.01); *B29K 2105/048* (2013.01); *B29K 2105/24* (2013.01); *B29L 2023/003* (2013.01); *B29L 2031/463* (2013.01); *B29L 2031/52* (2013.01)

(58) Field of Classification Search
CPC ....... B29C 48/022; B29C 45/00; B29C 48/12; B29C 66/71; B29C 66/14; B29C 53/40; B29C 66/727; B29C 66/45; B29C 66/4322; B29C 66/128; B29C 65/48; A63B 21/4049; A63B 23/02; A63B 21/0004; A63B 26/003; A63B 21/4033; B29K 2023/06; B29K 2105/24; B29K 2105/046; B29K 2105/048; B29D 23/001; B29L 2031/52; B29L 2023/003; B29L 2031/463; A61H 15/0092; A61H 2201/169; A61H 2015/0014; A61H 2201/1695; A61H 15/00–02

See application file for complete search history.

(56) References Cited

U.S. PATENT DOCUMENTS

| | | | |
|---|---|---|---|
| 1,611,811 A | 12/1926 | Brickey | |
| 1,688,764 A | 10/1928 | Trankowski | |
| 1,882,490 A * | 10/1932 | Falck | A61H 15/0092 601/120 |
| 1,958,936 A | 5/1934 | Bajette et al. | |
| 2,037,495 A | 4/1936 | Brogan | |
| 2,039,495 A | 5/1936 | Schlosser | |
| 2,052,656 A | 9/1936 | Prien | |
| 2,221,785 A | 11/1940 | Douglas | |
| 2,416,471 A | 2/1947 | De Chappedelaine | |
| 2,461,413 A * | 2/1949 | Dirand | A61H 15/0092 601/120 |
| 2,578,916 A * | 12/1951 | Belleville | A61H 15/00 492/33 |
| 2,994,327 A | 8/1961 | Otto et al. | |
| 3,037,500 A | 6/1962 | Daugherty | |
| 3,095,337 A | 6/1963 | Chase | |
| D201,598 S | 7/1965 | Caspar | |
| 3,205,888 A | 9/1965 | Stroop | |
| 3,298,687 A | 1/1967 | Douglas | |
| 3,419,268 A * | 12/1968 | Bellet | A61H 15/00 482/132 |
| 3,465,364 A | 9/1969 | Edelson | |
| 3,547,112 A | 12/1970 | Courtney | |
| 3,548,814 A * | 12/1970 | Montgomery | A61H 15/00 601/118 |
| 3,628,790 A | 12/1971 | Gordon | |
| 3,645,256 A * | 2/1972 | Morrison | A61H 15/00 601/122 |
| 3,662,748 A * | 5/1972 | Thurman | A61H 15/00 601/121 |
| 3,664,334 A | 5/1972 | O'Neil | |
| 3,672,356 A * | 6/1972 | Possick | A61H 15/0092 601/120 |
| 3,684,618 A | 8/1972 | Geschwender | |
| 4,002,163 A | 1/1977 | Jackson, Jr. | |
| 4,012,348 A | 3/1977 | Chelland et al. | |
| 4,014,325 A | 3/1977 | Clarke | |
| 4,067,324 A | 1/1978 | Greenwalt | |
| 4,109,649 A * | 8/1978 | Iyomasa | A61H 15/00 601/121 |
| 4,149,815 A | 4/1979 | Kawam | |
| 4,191,178 A | 3/1980 | Wisnieski | |
| D256,841 S | 9/1980 | Corbett et al. | |
| D257,883 S | 1/1981 | Holmberg | |
| 4,345,757 A | 8/1982 | Lo Voi | |
| 4,378,007 A | 3/1983 | Kahadourian | |
| 4,495,900 A | 1/1985 | Stockmeyer | |
| 4,648,387 A * | 3/1987 | Simmons | A61H 15/0092 482/79 |
| 4,755,408 A | 7/1988 | Noel | |
| 4,807,603 A | 2/1989 | Yasui | |
| D300,957 S | 5/1989 | Moore | |
| 4,945,900 A * | 8/1990 | Masuda | A61H 15/0092 601/120 |
| 4,955,914 A | 9/1990 | Caniglia et al. | |
| 5,078,387 A * | 1/1992 | Faust | A61H 15/0092 601/40 |
| 5,168,576 A | 12/1992 | Krent et al. | |
| 5,230,679 A | 7/1993 | Olsen | |
| 5,338,277 A | 8/1994 | Yang | |
| 5,348,505 A | 9/1994 | Rothhammer | |
| 5,359,739 A | 11/1994 | Rains et al. | |
| 5,411,470 A | 5/1995 | Liptak et al. | |
| D361,132 S | 8/1995 | Lee | |
| 5,458,549 A | 10/1995 | Obery | |
| D371,202 S * | 6/1996 | Zajas | D24/211 |
| 5,544,377 A | 8/1996 | Gostine | |
| 5,558,625 A | 9/1996 | McKay | |

(56) References Cited

U.S. PATENT DOCUMENTS

| | | | |
|---|---|---|---|
| 5,577,995 A * | 11/1996 | Walker | A61H 15/0092 601/118 |
| 5,637,065 A | 6/1997 | Chang | |
| 5,675,850 A | 10/1997 | Schmitt | |
| 5,772,614 A | 6/1998 | Lindquist | |
| 5,797,154 A | 8/1998 | Conreras | |
| 5,824,013 A | 10/1998 | Allen | |
| 5,829,832 A | 11/1998 | Molee et al. | |
| 5,857,232 A | 1/1999 | Mahdavi | |
| 5,904,406 A | 5/1999 | Stewart | |
| 5,937,461 A | 8/1999 | Dombrowski et al. | |
| 6,000,079 A | 12/1999 | Dranger | |
| 6,129,687 A | 10/2000 | Powell et al. | |
| D447,376 S | 9/2001 | Kramer | |
| 6,360,388 B2 | 3/2002 | Langer | |
| 6,398,694 B1 | 6/2002 | Bountourakis | |
| 6,419,650 B1 * | 7/2002 | Ryan | A61H 39/04 601/19 |
| 6,449,788 B1 | 9/2002 | Nichols | |
| D463,952 S | 10/2002 | Zemei | |
| 6,499,485 B1 | 12/2002 | Perera | |
| 6,536,057 B2 | 3/2003 | Fennell et al. | |
| 6,565,522 B1 | 5/2003 | Chen | |
| 6,599,485 B1 | 7/2003 | Yamauchi et al. | |
| 6,604,789 B1 | 8/2003 | Downing | |
| 6,692,416 B1 | 2/2004 | Davis | |
| 6,694,550 B2 | 2/2004 | Lee | |
| 6,708,353 B2 | 3/2004 | Han | |
| 6,764,456 B1 * | 7/2004 | Doherty | A61H 15/00 601/118 |
| 6,793,998 B1 | 9/2004 | Silvestre | |
| 6,817,066 B1 | 11/2004 | Williams et al. | |
| 6,844,055 B1 | 1/2005 | Grinshpun et al. | |
| 6,990,699 B2 | 1/2006 | Hedges | |
| 7,086,101 B2 | 8/2006 | Welch et al. | |
| 7,108,646 B1 | 9/2006 | Quick | |
| 7,223,251 B1 * | 5/2007 | Cassidy Phillips | A61H 15/0092 601/118 |
| 7,300,612 B2 | 11/2007 | Grinshpun et al. | |
| 7,311,644 B2 | 12/2007 | Hale | |
| D567,952 S | 4/2008 | Fink | |
| D567,955 S | 4/2008 | Fink | |
| 7,918,774 B2 | 4/2011 | Dye | |
| 8,002,682 B2 | 8/2011 | Dye | |
| D647,980 S | 11/2011 | Davis et al. | |
| 8,556,837 B1 * | 10/2013 | Poirier | A61H 15/0092 601/46 |
| 9,345,921 B2 | 5/2016 | Dye | |
| 9,539,167 B2 | 1/2017 | Dye | |
| 9,656,112 B2 | 5/2017 | Dye | |
| 9,668,933 B1 * | 6/2017 | Johnson | A61H 15/00 |
| 9,901,508 B2 | 2/2018 | Fitzmaurice | |
| 10,265,238 B2 | 4/2019 | Dye | |
| 10,278,890 B2 | 5/2019 | Dye | |
| 10,695,258 B1 * | 6/2020 | Johnson | A61H 15/00 |
| 10,695,260 B2 | 6/2020 | Dye | |
| 2001/0009043 A1 | 7/2001 | Langer | |
| 2002/0193714 A1 * | 12/2002 | Pecora | A61H 15/00 601/121 |
| 2003/0100417 A1 | 5/2003 | Westwood | |
| 2003/0100851 A1 * | 5/2003 | Martinec | A61H 15/00 601/121 |
| 2003/0126684 A1 | 7/2003 | Han | |
| 2004/0082449 A1 | 4/2004 | Brown, Jr. | |
| 2005/0085749 A1 * | 4/2005 | Baerwalde | A61H 15/0092 601/15 |
| 2005/0177946 A1 | 8/2005 | Riley | |
| 2005/0215928 A1 * | 9/2005 | Banks | A61H 15/0092 601/112 |
| 2006/0094574 A1 | 5/2006 | Worthington | |
| 2006/0142677 A1 * | 6/2006 | Perez | A61H 15/0092 601/120 |
| 2006/0235343 A1 * | 10/2006 | Fitzmaurice | A61H 15/0092 601/134 |
| 2007/0021784 A1 | 1/2007 | Hurd | |
| 2007/0118963 A1 * | 5/2007 | Snyder | A61H 7/003 2/158 |
| 2007/0129654 A1 * | 6/2007 | Anderson | A61H 15/00 601/119 |
| 2007/0138122 A1 | 6/2007 | Shimada | |
| 2008/0004553 A1 * | 1/2008 | Tsai | A61H 15/0092 601/120 |
| 2008/0090707 A1 * | 4/2008 | Dye | A61H 15/0092 482/132 |
| 2008/0167168 A1 | 7/2008 | Hurst | |
| 2008/0200851 A1 * | 8/2008 | Faussett | A61H 15/0092 601/119 |
| 2009/0017995 A1 | 1/2009 | Freiberg | |
| 2009/0054815 A1 * | 2/2009 | Briscoe | A61H 15/0092 601/134 |
| 2009/0112137 A1 * | 4/2009 | Lamore | A61H 15/0092 601/112 |
| 2009/0222994 A1 * | 9/2009 | Wood | A61H 15/0092 5/655.9 |
| 2012/0065557 A1 * | 3/2012 | Phillips | A63B 23/0222 601/99 |
| 2012/0122635 A1 * | 5/2012 | Tsai | A63B 21/00047 482/132 |
| 2012/0172771 A1 * | 7/2012 | Jian | A61H 23/02 601/46 |
| 2012/0259257 A1 * | 10/2012 | Nelson | A61H 39/04 601/119 |
| 2012/0277077 A1 * | 11/2012 | Hsu | A63B 21/4037 482/142 |
| 2013/0090220 A1 * | 4/2013 | Bertram | A61H 15/0092 482/139 |
| 2013/0096472 A1 * | 4/2013 | Bertram | A61H 15/0092 601/120 |
| 2013/0178766 A1 * | 7/2013 | Abdur-Raoof | A61H 15/00 601/19 |
| 2013/0178768 A1 * | 7/2013 | Dalebout | A61H 15/0092 601/46 |
| 2014/0012168 A1 * | 1/2014 | Carlson | A61H 15/0092 601/134 |
| 2014/0128786 A1 * | 5/2014 | Ross | A61H 15/0092 601/118 |
| 2015/0045707 A1 * | 2/2015 | Selvaggio | A61H 15/0092 601/118 |
| 2015/0080774 A1 * | 3/2015 | Olaya | A61H 15/00 601/121 |
| 2015/0209220 A1 * | 7/2015 | Lin | A61H 15/0092 601/119 |
| 2016/0022529 A1 * | 1/2016 | Abdo | A61H 15/0092 601/119 |
| 2016/0310352 A1 * | 10/2016 | Chen | A61H 15/02 |
| 2017/0143583 A1 * | 5/2017 | Lin | A61H 15/0092 |
| 2017/0202730 A1 * | 7/2017 | Lin | A61H 15/0092 |
| 2017/0216133 A1 * | 8/2017 | Yih | A61H 15/0092 |
| 2017/0239133 A1 | 8/2017 | Dye | |
| 2017/0246077 A1 | 8/2017 | Dye | |
| 2017/0252262 A1 * | 9/2017 | Chang | A61H 15/00 |

FOREIGN PATENT DOCUMENTS

| | | | |
|---|---|---|---|
| CA | 2121949 A1 | 10/1994 | |
| DE | 8021917 U1 | 11/1980 | |
| DE | 20119764 U1 | 12/2001 | |
| DE | 2006005080 U1 | 9/2006 | |
| DE | 102006005876 A1 * | 10/2007 | A61H 15/00 |
| EP | 0761196 A1 | 3/1997 | |
| FR | 2480118 A1 | 4/1980 | |
| GB | 261408 | 11/1927 | |
| GB | 519875 A | 8/1939 | |
| GB | 2303793 | 3/1997 | |
| JP | 3018281 U | 5/1995 | |
| JP | H09285521 A | 4/1996 | |
| JP | 2000000285 A | 1/2000 | |
| JP | 2001070386 A | 3/2001 | |
| JP | 3087002 U | 12/2001 | |

(56) References Cited

FOREIGN PATENT DOCUMENTS

| | | |
|---|---|---|
| JP | 2004-305232 A | 11/2004 |
| KR | 200338399 Y1 | 1/2004 |
| KR | 20040033243 | 4/2004 |
| KR | 200402125 | 11/2005 |
| KR | 20060017476 | 2/2006 |
| KR | 1020070095507 | 10/2007 |
| WO | 1989/003667 | 5/1989 |
| WO | 2004/058132 | 7/2004 |
| WO | 2005/056381 A1 | 6/2005 |
| WO | 2006101314 A1 | 9/2006 |
| WO | WO-2009141670 A1 * | 11/2009 ............. A61H 15/00 |

OTHER PUBLICATIONS

AliMed Textured Roller with Ridges, captured by the Wayback Machine on Jun. 28, 2006; available at: (https://web.archive.org/web/20060628063637/http://www.alimed.com/products.asp?view=newitems).

AliMed Textured Roller with Ridges, captured by the Wayback Machine on Oct. 17, 2006; available at: (http://web.archive.org/web/20061017144242/http://www.alimed.com/ProductDetail.asp?style=31710&fprd=AliMed+Textured+Rollers+with+Ridges&oid1=&oid2=).

OPTP Tools For Fitness—Knowledge For Health, website catalog, Product Catalog 17, 2014, www.OPTP.com, 3 pages.

*Performance Solutions, LLC* vs. *Ron Johnson Engineering, Inc et al.*, Complaint and all Exhibits (Dkt. No. 1) (Hawaii), Nov. 20, 2020 (536 pages).

Feb. 11, 2021 Plaintiff Performance Solutions, LLC's Infringement Contentions including charts (Hawaii) (115 pages).

*Performance Solutions, LLC* vs. *Sea Ties, LLC* d/b/a RumbleRoller, Complaint and all Exhibits (Dkt. Nos. 1 and 2) (Louisiana), Nov. 20, 2020 (538 pages).

Feb. 11, 2021 Plaintiff Performance Solutions, LLC's Infringement Contentions including charts (Louisiana) (111 pages).

Notice of Motion and Motion of Defendant Performance Solutions, LLC for Entry of a Preliminary Injunction, Proposed Order, Memorandum of Law, Exhibits 1-6 (*PowXv. Performance Solutions*) (Dkt. No. 15, 15-1, 16, 16-1-16-6), Apr. 10, 2024 (541 pages).

Defendant Performance Solutions, LLC's Reply in Further Support of Motion for Entry of Preliminary Injunction and Supporting Declarations (*PowXv Performance Solutions*) (Dkt. No. 24, 24-1-24-2), Apr. 30, 2024 (130 pages).

May 2, 2024 Hearing Transcript (*PowXv Performance Solutions*) (84 pages).

May 22, 2024 Hearing Transcript (*PowXv Performance Solutions*) (132 pages).

Jun. 14, 2024 Opinion & Order Granting Preliminary Injunction (*PowX v Performance Solutions*) (34 pages).

Jul. 8, 2024 Performance Solutions, LLC's Answer, Defenses and Counterclaims to Complaint and Exhibits (*Beyond the Cloud v Performance Solutions*) (Dkt. No. 009, 009-1) (258 pages).

Nov. 1, 2021 Defendant and Counter-Claimant Performance Solutions, LLC's Infringement Contentions (*Beyond the Cloud v Performance Solutions*) (225 pages).

Apr. 22, 2019 Defendants and Counter-Claimant Performance Solutions, LLC's Counterclaims against Prosource Discounts and all Exhibits (*Prosource Discountsv Performance Solutions*) (Dkt. No. 19 and Attachments 1-22) (221 pages).

Dr. Riter Shiatsu, "Hand Held Massage Tool - ROLL Back and Body Massage Roller Tool", URL: http://www.comfortchannel.com/prod.itml/icOid/1827 4 pages.

OPTP, Inc. Product Catalog 17, Copyright 2004, p. 28

OPTP, Inc. Product Catalog 17. (Year: 2004) (3 pages).

U.S. Patent and Trademark Office, Registration U.S. Pat. No. 2,550,917, Combined Declaration of Use and/or Excusable Nonuse/Application for Renewal of Registration of a Mark under Sections 8 & 9, for mark "FLEXBAR", 16 pgs.

US Patent Trial and Appeal Board, Decision on Appeal for Reexamination Control No. U.S. Appl. No. 90/014,614, Appeal 2023-003493, Dec. 6, 2023, 20 pages.

US Patent Trial and Appeal Board, Decision on Appeal for Reexamination Control No. U.S. Appl. No. 90/014,616, Appeal 2023-003494, Dec. 6, 2023, 21 pages.

US Patent Trial and Appeal Board, Decision on Appeal for Reexamination Control No. U.S. Appl. No. 90/014,620, Appeal 2023-003471, Dec. 6, 2023, 22 pages.

US Patent Trial and Appeal Board, Decision on Appeal for Reexamination Control No. U.S. Appl. No. 90/014,621, Appeal 2023-003470, Dec. 6, 2023, 20 pages.

U.S. Patent and Trademark Office, Order Denying Request for Ex Parte Reexamination, U.S. Pat. No. 9,539,167, Apr. 16, 2024 (16 pages).

U.S. Patent and Trademark Office, Order Granting Request for Ex Parte Reexamination, U.S. Pat. No. 9,539,167, Aug. 9, 2024 (27 pages).

U.S. Patent and Trademark Office, Order Granting Request for Ex Parte Reexamination, U.S. Pat. No. 10,278,890, Aug. 9, 2024 (25 pages).

U.S. Patent and Trademark Office, Order Granting Request for Ex Parte Reexamination, U.S. Pat. No. 10,695,260, Aug. 9, 2024 (26 pages).

U.S. Patent and Trademark Office, Order Granting Request for Ex Parte Reexamination, U.S. Pat. No. 9,656,112, Aug. 20, 2024 (24 pages).

* cited by examiner

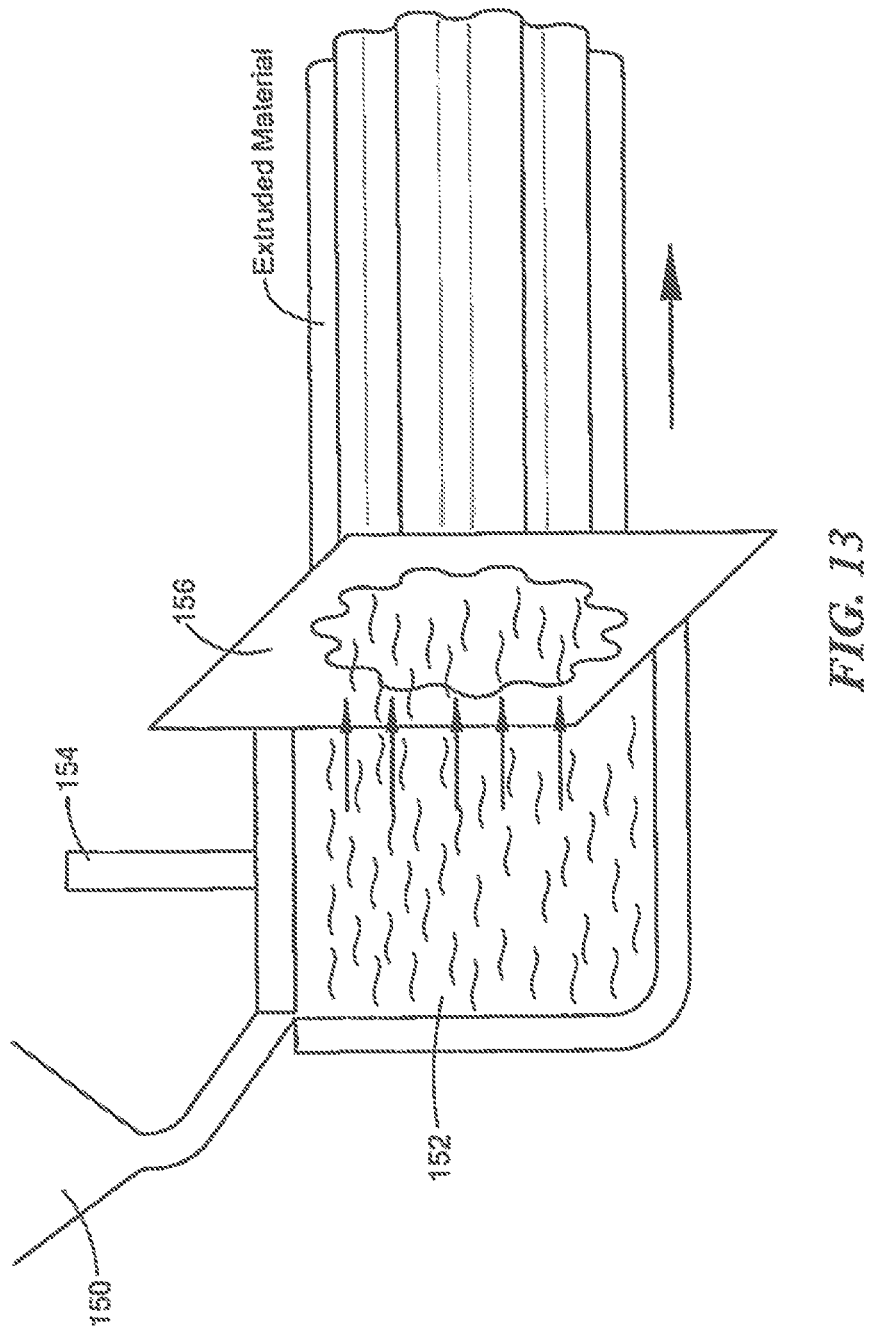

THERAPEUTIC, FITNESS, AND SPORTS ENHANCEMENT DEVICE

RELATED APPLICATIONS

This application is a continuation of U.S. patent application Ser. No. 16/375,996 filed on Apr. 5, 2019 which claims benefit of and priority thereto under 35 U.S.C. § 119, 120, 363, 365 and 37 C.F.R. §§ 1.55 and 1.78, and is a continuation of U.S. patent application Ser. No. 15/592,915 filed on May 11, 2017 which claims benefit of and priority thereto under 35 U.S.C. § 119, 120, 363, 365 and 37 C.F.R. §§ 1.55 and 1.78, and U.S. patent application Ser. No. 15/592,915 is a continuation of U.S. patent application Ser. No. 15/005,380 filed on Jan. 25, 2016 (now U.S. Pat. No. 9,656,112), which claims benefit of and priority thereto under 35 U.S.C. § 119, 120, 363, 365 and 37 C.F.R. §§ 1.55 and 1.78, and Ser. No. 15/005,380 is a divisional application of U.S. patent application Ser. No. 13/065,850 filed on Mar. 31, 2011 (now U.S. Pat. No. 9,345,921) which claims benefit of and priority thereto under 35 U.S.C. § 119, 120, 363, 365 and 37 C.F.R. §§ 1.55 and 1.78, and Ser. No. 13/065,850 is a continuation-in-part of U.S. patent application Ser. No. 11/827,361 filed on Jul. 11, 2007 (now U.S. Pat. No. 7,918,774), which claims the benefit of and priority to U.S. Provisional Application Ser. No. 60/831,726 filed Jul. 18, 2006. All said references are incorporated by reference herein.

FIELD OF THE INVENTION

This subject invention relates to a therapeutic, fitness, and sports enhancement device.

BACKGROUND OF THE INVENTION

Conventional cylindrical foam rolls are often used for tissue mobilization, improving body core strength and balance training. When used for tissue mobilization, the user typically lies or sits on the cylindrical foam roll and moves back and forth to mobilize target soft tissue. The benefits of soft tissue mobilization include, inter alia, decreased muscle soreness, relief from joint stress, decreased neuromuscular hypertonicity, increased joint range motion, extensibility of musculotendinous junctions, increased neuromuscular efficiency, and maintenance of normal functional muscle length. These benefits enhance recovery of injuries and also maximize sports performance and result in improved fitness.

However, the completely cylindrical shape of a conventional foam roll minimizes the effect of tissue mobilization. Moreover, such a design often results in the user falling off the cylindrically shaped foam roll, which is aggravating and cumbersome.

When used for body core strength and balance training, the user typically stands or on the cylindrical foam roll device to enhance balance, coordination and core strength. However, because the user can easily fall off the cylindrical shaped foam roll, the effectiveness of the body core strength and balance training session is often minimized.

Smaller sized cylindrical foam rolls may be used to mobilize small soft tissue structures, such as the foot, plantar fascia, heel, Achilles tendon and associated calf tissue, elbow, wrist, knee, head, neck, and the like, to assist in the recovery of plantar fasciitis or similar type ailments.

However, conventional smaller sized cylindrical foam rolls are typically ineffective at mobilizing the soft tissue of small soft tissue structures because they cannot effectively break up collagenous fibers therein.

Conventional foot massaging devices and patient positioning devices are known which may include rolls with projections or cone shaped rolls. See, e.g., U.S. Pat. Nos. 2,037,495, 5,359,739, 5,411,470, and 6,764,456. However, the rolls and devices disclosed therein are limited to a one diameter, one density, and a one type of shape of the projections and thus fail to effectively mobilize soft tissue structures of the human body.

BRIEF SUMMARY OF THE INVENTION

It is therefore an object of this invention to provide a therapeutic, fitness, and sports enhancing device.

It is a further object of this invention to provide such a therapeutic, fitness, and sports enhancement device in which one or more of the density and diameter in combination with the shape of the projections may be chosen to effectively mobilize soft tissue structures of the human body.

It is a further object of this invention to provide such a therapeutic, fitness, and sports enhancement device which maximizes mobilization of soft tissue.

It is a further object of this invention to provide such a therapeutic, fitness, and sports enhancement device which enhances flexibility.

It is a further object of this invention to provide such a therapeutic, fitness, and sports enhancement device which improves body core strength training.

It is a further object of this invention to provide such a therapeutic, fitness, and sports enhancement device which optimizes soft tissue distensibility.

It is a further object of this invention to provide such a therapeutic, fitness, and sports enhancement device which improves balance training.

It is a further object of this invention to provide such a therapeutic, fitness, and sports enhancement device which enhances recovery from injury.

It is a further object of this invention to provide such a therapeutic, fitness, and sports enhancement device which maximizes sports performance.

It is a further object of this invention to provide such a therapeutic, fitness, and sports enhancement device which improves fitness.

It is a further object of this invention to provide such a therapeutic, fitness, and sports enhancement device which improves mobilization of the soft tissue of small soft tissue structures.

It is a further object of this invention to provide such a therapeutic, fitness, and sports enhancement device which effectively breaks up collagenous fibers of soft tissue structures.

It is a further object of this invention to provide such a therapeutic, fitness, and sports enhancement device which effectively helps treat plantar fasciitis.

This invention features a therapeutic, fitness, and sports enhancement device including a cylindrically shaped body having a predetermined density and predetermined diameter, the body including a plurality of projections of a predetermined shape. One or more of the predetermined density and the predetermined diameter in combination with the predetermined shape of the projections optimize mobilization of soft tissue structures of the human body.

In one embodiment, one or more of the predetermined density and the predetermined diameter in combination with the predetermined shape of the projections may optimize body core strength and optimize balance training. One or more of the predetermined density and the predetermined diameter in combination with the predetermined shape may effectively break up collagenous fibers of the soft tissue structures. One or more of the predetermined density and the predetermined diameter in combination with the predetermined shape of the projections may enhance flexibility of the soft tissue structures. One or more of the predetermined density and the predetermined diameter in combination with the predetermined shape of the projections may enhance distensibility of the soft tissue structures. The predetermined shape of the projections may include a rounded shape, a curved shape, a triangle shape, a square, a notch shape, a cylindrical shape with rounded ends, and cylindrical shape with flat ends. The projections may longitudinally extend over a length of the body. The projections may extend perpendicular to a longitudinal axis of the body. The projections may radially extend from the body are at the same angles. The projections may radially extend from the body at different angles. The projections may be configured in a wave pattern. The projections may be configured in a Z pattern. The projections may be configured in a helical pattern. The projections may be individually spaced in a predetermined pattern over the body. The predetermined pattern may include an aligned pattern of a plurality of shaped projections. The predetermined pattern may include an offset pattern of a plurality of shaped projections. The cylindrically shaped body and the projections may be made of a pliable material. The pliable material may include a closed-cell foam material. The closed-cell foam material may include a chemically cross-linked polyethylene foam. The pliable material may include expandable polyethylene. The pliable material may include plastic. The number of the projections may be configured to optimize mobilization of the soft tissue structures and/or optimize body core and balance training and/or effectively break up collagenous fibers of the soft tissue structures and/or enhance flexibility of the soft tissue structures and/or enhance distensibility of the soft tissue structures. The device may include a handle extending through the body.

This invention also features a therapeutic, fitness, and sports enhancement device including a cylindrically shaped core having a predetermined diameter. An overlay is about the core having a predetermined density, the overlay including a plurality of projections of a predetermined shape. One or more of the predetermined density and the predetermined diameter in combination with the predetermined shape of the projections optimize mobilization of soft tissue structures of the human body.

In one embodiment, one or more of the predetermined density and the predetermined diameter in combination with the predetermined shape of the projections may effectively optimize body core strength and optimize balance training. One or more of the predetermined density and the predetermined diameter in combination with the predetermined shape of the projections may effectively break up collagenous fibers of the soft tissue structures. One or more of the predetermined density and the predetermined diameter in combination with the predetermined shape of the projections may enhance flexibility of the soft tissue structures. One or more of the predetermined density and the predetermined diameter in combination with the predetermined shape of the projections may enhance distensibility of the soft tissue structures. The predetermined shape of the projections may include a rounded shape, a curved shape, a triangle shape, a square, a notch shape, a cylindrical shape with rounded ends, and cylindrical shape with flat ends. The projections longitudinally may extend over a length of the body. The projections may extend perpendicular to a longitudinal axis of the body. The projections may radially extend from the body are at the same angles. The projections may radially extend from the body at different angles. The projections may be configured in a wave pattern. The projections may be configured in a Z pattern. The projections may be configured in a helical pattern. The projections may be individually spaced in a predetermined pattern over the body. The predetermined pattern may include an aligned pattern of a plurality of shaped projections. The predetermined pattern may include an offset pattern of a plurality of shaped projections. The cylindrically shaped body and the projections may be made of a pliable material. The pliable material may include a closed-cell foam material. The closed-cell foam material may include a chemically cross-linked polyethylene foam. The pliable material may include expandable polyethylene. The pliable material may include resin. The number of the projections may be configured to optimize mobilization of the soft tissue structures and/or optimize body core and balance training and/or effectively break up collagenous fibers of the soft tissue structures and/or enhance flexibility of the soft tissue structures and/or enhance distensibility of the soft tissue structures. The device may include a handle extending through the body.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 13 is a schematic side-view showing one example of an extrusion process which may be used to manufacture the therapeutic, fitness, and sports enhancement device shown in FIGS. 1-10;

DETAILED DESCRIPTION OF THE INVENTION

Figure 1:
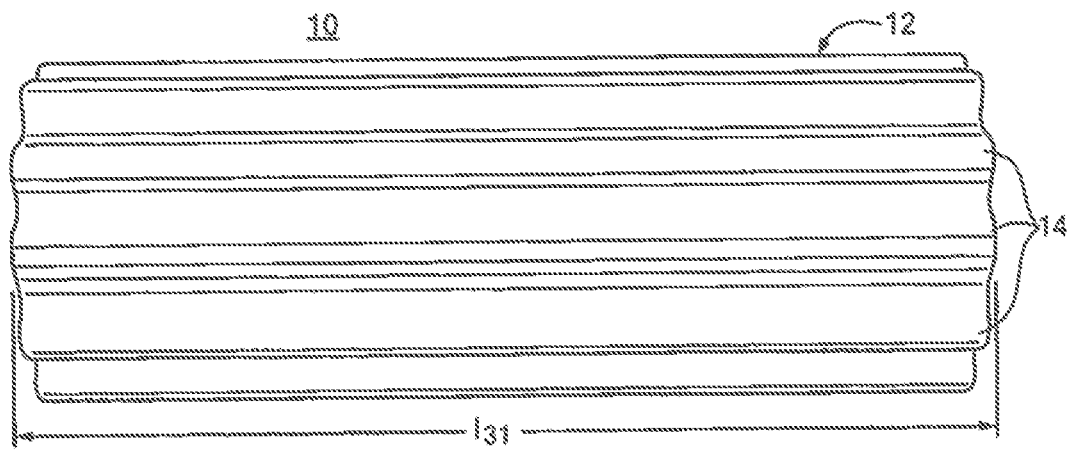
FIG. 1 is a three-dimensional perspective side-view of one embodiment of the therapeutic, fitness, and sports enhancement device of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1, one embodiment of therapeutic, fitness, and sports enhancement device 10 of this invention including cylindrically shaped body 12 having a predetermined density and predetermined diameter. Body 12 includes a plurality of projections 14 of a predetermined shape. One or more of the predetermined density and the predetermined diameter of body 12 in combination with the shape of the projections effectively mobilize soft tissue structures of the human body, as discussed in further detail below.

Body 12 with projections 14 is preferably made of a pliable material, e.g., a closed-cell foam material, e.g., a chemically, cross-linked closed-cell polyethylene foam, such as MINICEL® L200, L300 or L380, available from Sekisui Voltek (Lawrence, MA). In other examples, body 12 may be made of expandable polyethylene (EPE) or a plastic type material using foam fabricators, as known by those skilled in the art. Other similar type of pliable materials and closed-cell foams known to those skilled in the art may also be utilized to manufacture device 10.

Figure 2:
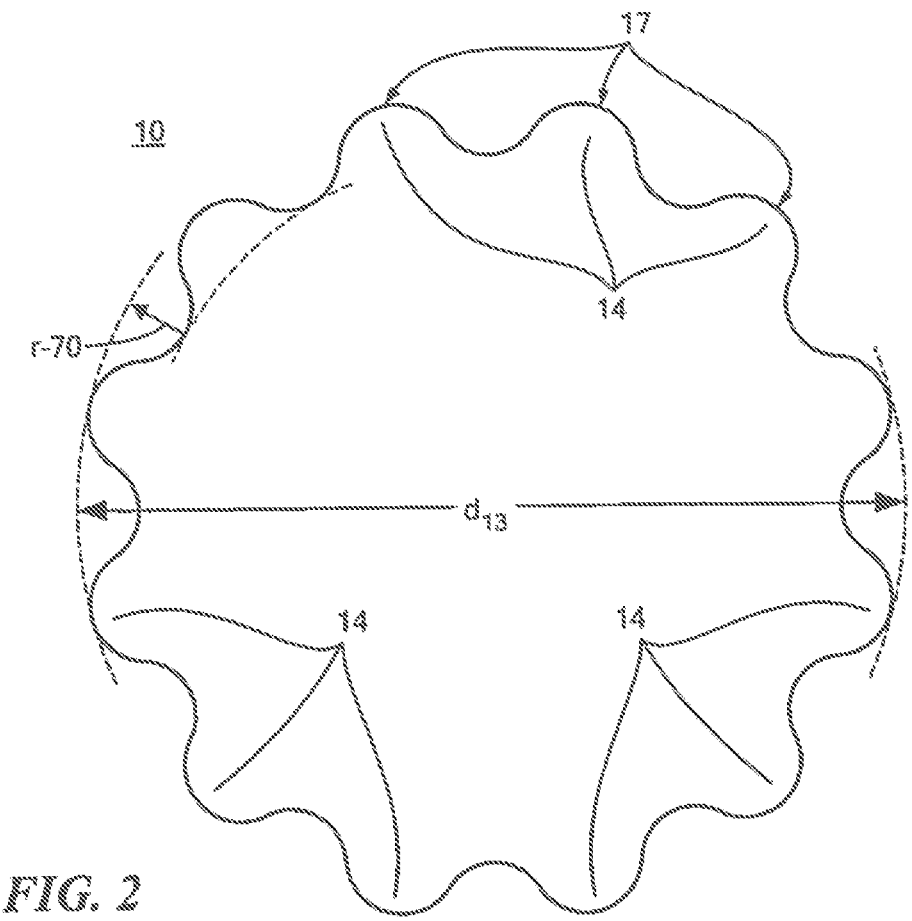
FIG. 2 is a schematic end-view showing in further detail one embodiment of the projections shown in FIG. 1.

In one example, the density of body 12, the diameter, d-13, FIG. 2, of body 12 in combination with and the shape of projections 14 are preferably chosen to effectively mobilize soft tissue structures of the human body. The soft tissue structures mobilized in one embodiment may include, inter alia, the Quadriceps, Hamstrings, Rhomboids, Mid/Lower Back, Glutes/Piriformis, Hip Rotators, Hamstrings, IT band, Calf, and Shins.

In this example, which may be referred to as the "soft" device 10, the density of the pliable material of body 12 is preferably in the range of about 2.0 lb/ft$^3$ to about 6.0 lb/ft$^3$.

The diameter, d-27, is typically in the range between about 3 inches to about 15 inches, e.g., about 7 inches. In this example, cylindrically shaped body 12, FIG. 3, preferably has a length, l-31, between about 18 inches and 36 inches. In one preferred example, body 12 has a diameter of about 7 inches and a length of about 18 inches. In another example, body 12 has a diameter of about 7 inches and a length of about 36 inches.

Figure 3:
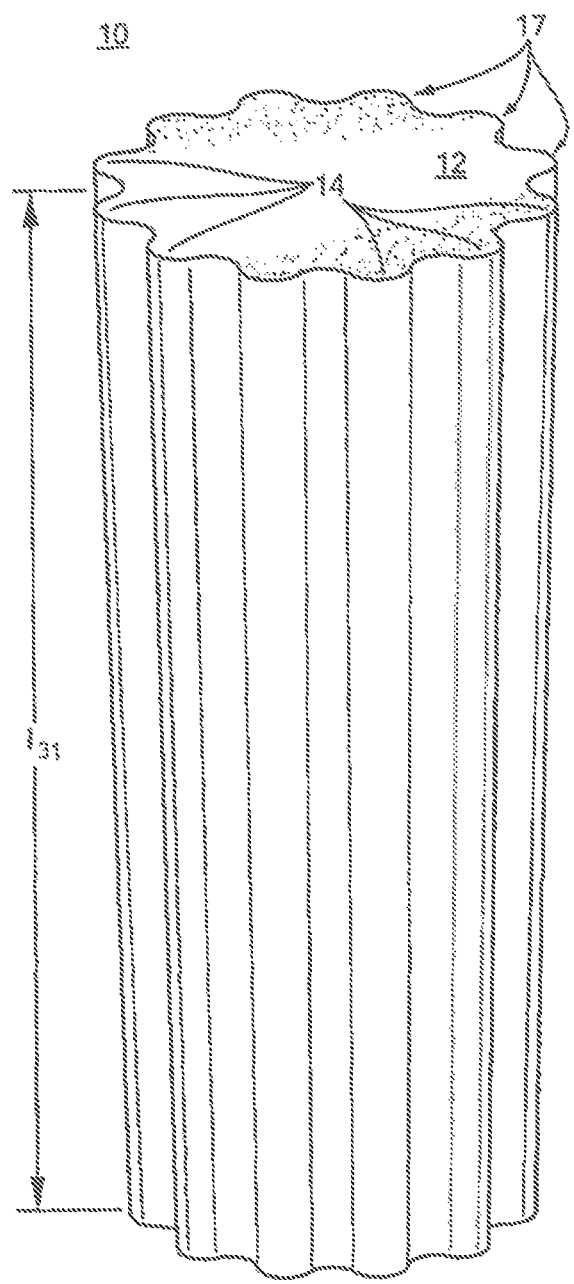
FIG. 3 is another three-dimensional perspective side-view of the therapeutic, fitness, and sports enhancement device shown in FIGS. 1 and 2.
Figure 4:
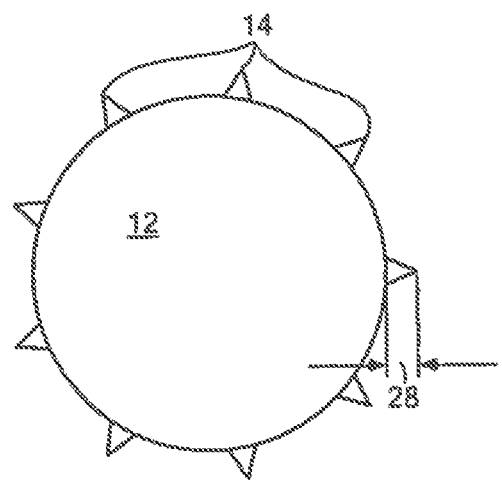
FIG. 4 is a schematic end-view showing another embodiment of the projections of this invention.
Figure 5:
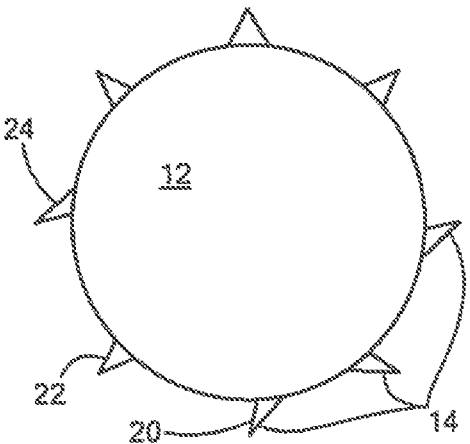
FIG. 5 is a schematic end-view showing an example of the shaped projections shown in FIG. 4 extending at different angles.
Figure 6:
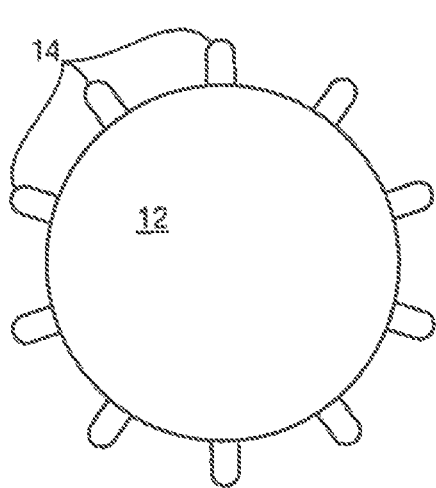
FIG. 6 is a schematic end-view of another embodiment of the projections of this invention.
Figure 7:
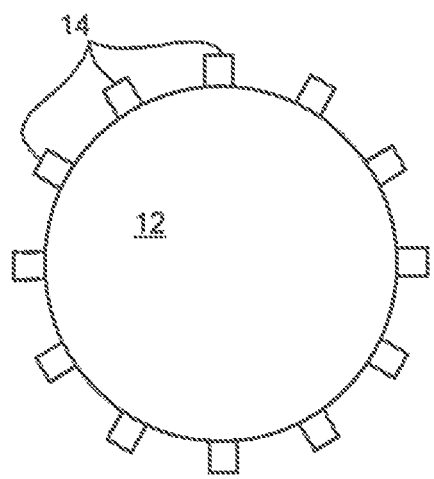
FIG. 7 is a schematic end-view of yet another embodiment of the projections of this invention.
Figure 8B:
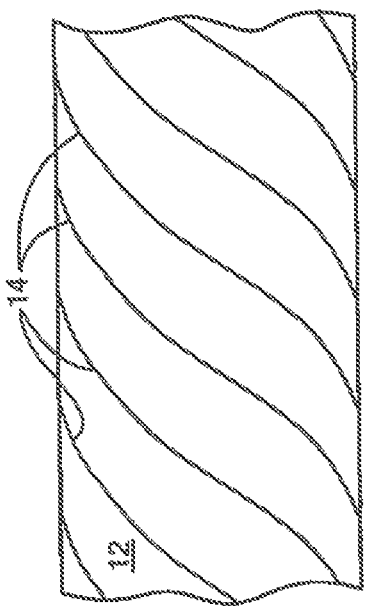
FIGS. 8A-8E are schematic views showing additional embodiments of the projections of this invention.
Figure 8D:
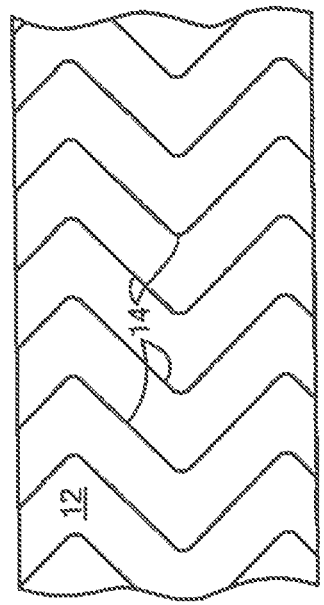
Figure 8A:
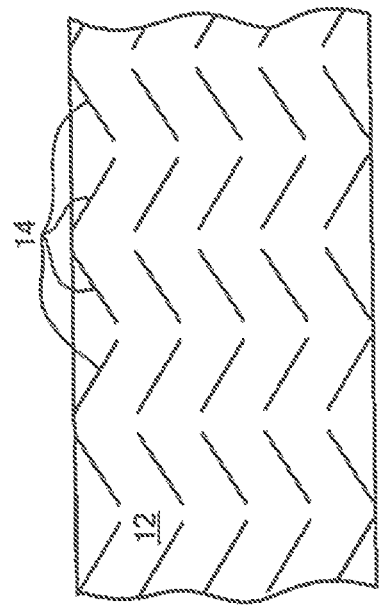
Figure 8C:
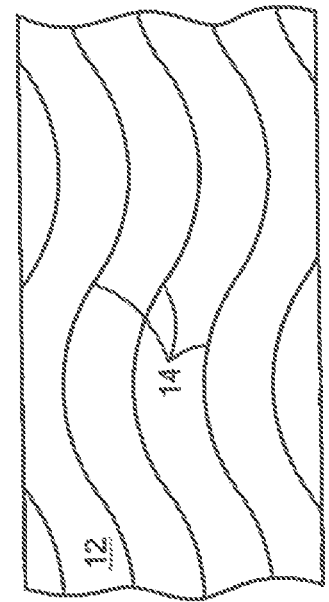
Figure 8E:
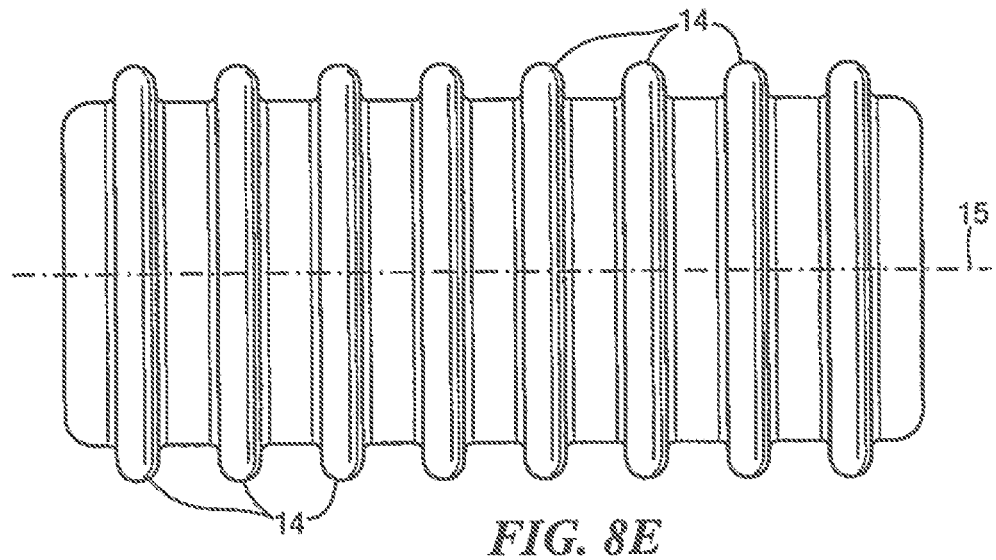
Figure 9A:
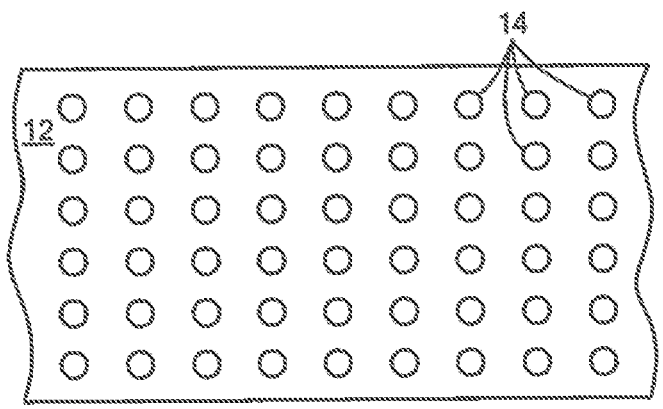
FIGS. 9A and 9B are schematic top-views showing exemplary individual patterns of the projections of this invention.
Figure 9B:
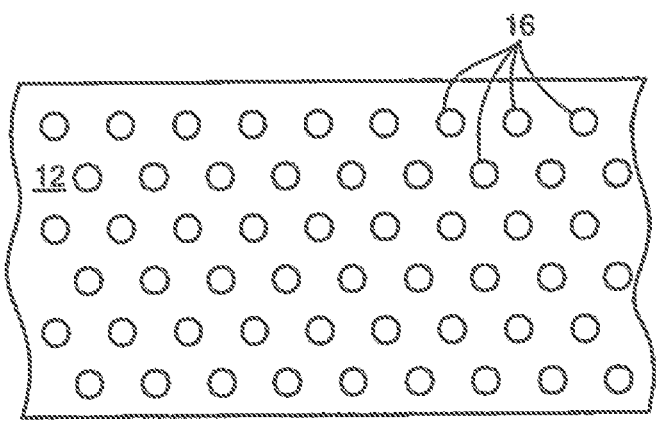

The shape projections 14 may be rounded, as shown at 17, FIGS. 2 and 3. In other designs, the shape of projections 14 may have triangle-shaped, as shown in FIG. 4. In this example, the projections 14 may radially extend from body 12 at the same angle. In other examples, projections 14, FIG. 5, may radially extend from body 12 at different angles, as indicated at 20, 22, and 24. In other examples, projections 14, FIG. 6, may be cylindrically shaped with rounded ends or may also be cylindrically shaped with flat ends, as shown in FIG. 7. Projections 14, FIGS. 1-7, may also extend over the length, l-31, FIGS. 1 and 3 of body 12, e.g., in a right angle pattern, as shown in FIG. 8A, in a helical pattern, as shown in FIG. 8B, in a wave pattern, as shown in FIG. 8C, in a Z pattern, as shown in FIG. 8D, or in a pattern perpendicular to longitudinal axis 15, as shown in FIG. 8E. In other designs, the plurality of shaped projections 14 may extend over body 12 in an individual pattern as shown in FIGS. 9A and 9B. Each of the plurality of shaped projections 14, FIGS. 1-9B, preferably radially, extends about ⅛ inch to about 3 inches from body 12, e.g., as shown by r-70, FIG. 2. In one example, "soft" device 10, FIGS. 1-3, may include eleven projections 14. In another example, "soft" device 10, FIG. 10, indicated at 41, may have twelve projections 14. In other examples, device 10 may have as few as 6 projections or as many as 20 projections 14, although device 10 may have any number of projections of various shapes, disclosed above, depending on the therapeutic use of device 10.

Figure 10:
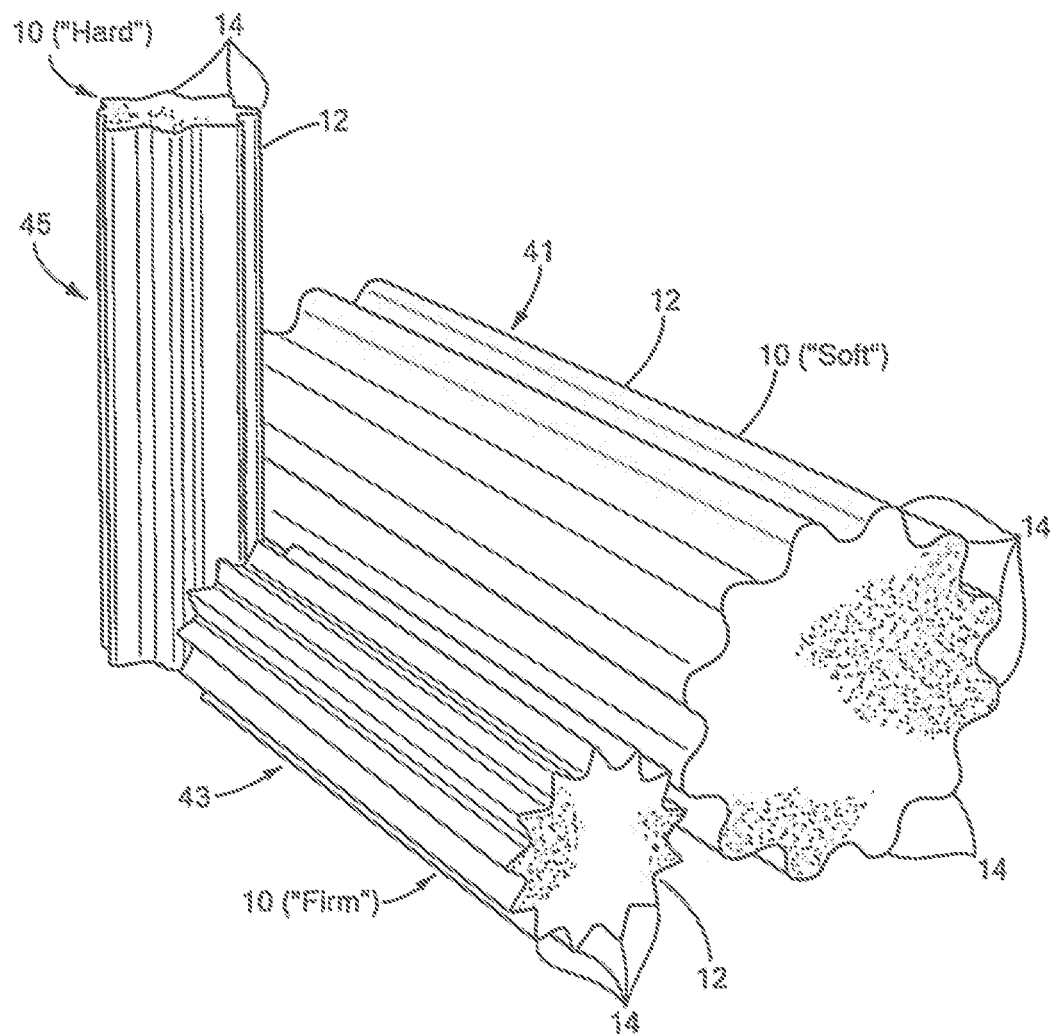
FIG. 10 is a three-dimensional side view showing three different examples of the therapeutic, fitness, and sports enhancement device of this invention having different densities, diameter, and shaped projections.

In another example, one or more of the density of body 12 and the diameter of body 12 in combination with the shape of projections 14 are preferably chosen to mobilize soft tissue structures of the human body which may include, inter alia, the Quadriceps, Hamstrings, Rhomboids, Rotator cuff, Glutes/Piriformis, Iliotibial band, Achilles tendon, Calf, feet, Head and Neck. In this example, often referred to as "firm" device 10, the density of the pliable material of body 12 is in the range of about 2.0 lb/ft$^2$ to about 12 lb/ft$^3$, e.g., preferably about 4 lb/ft$^3$. The diameter, d-27, FIG. 2, of body 12 is in the range of about 3 inches to about 8 inches, e.g., preferably about 3.5 or 7 inches. The length of body 12, length l-31, FIG. 3, is in the range of about 2 inches to about 36 inches. In one preferred example, body 12 has a diameter of about 3 inches and a length of about 8 inches. In yet another example, body 12 has a diameter of about 3.5 inches and a length of about 12 inches. In yet another example, body 12 has a diameter of about 7 inches and a length of about 18 inches. In another example, body 12 has a diameter of about 7 inches and a length of about 36 inches. Similar as discussed above, the plurality of shaped projections 14 have a predetermined shaped as discussed above with reference to FIGS. 1-10 and preferably radially extend about ⅛ inch to about 3 inches from body 12. FIG. 10 shows on example of "firm" device 10, indicated at 43. In this example, projections 14 may have a triangle shape as shown. In this design, device 10 has about thirteen projections 14, although device 10 could have any number of projections of various shapes, discussed above, depending on the therapeutic use of device 10.

In yet another example, the one or more of density of body 12 and the diameter of body 12 in combination with the shape of projections 14 are preferably chosen to mobilization soft tissue structures of the human body which may include, inter alia, the Quadriceps, Hamstrings, Rhomboids. Upper Trapezius, Forearm, Rotator cuff, Glutes, Piriformis, Calf, Feet, Head and Neck. In this example, which may be referred to as "hard" device 10, the density of the pliable material of body 12 is in the range of about 4.0 lb/ft$^2$ to about 12 lb/ft$^3$, e.g., preferably about 6 lb/ft$^3$. The diameter, d-27, FIG. 2, of body 12 is in the range of about 3 inches to about 8 inches, e.g., preferably about 3.5 or 7 inches. The length of body 12, length l-31, FIG. 3, is in the range of about 2 inches to about 36 inches. In one preferred example, body 12 has a diameter of about 3 inches and a length of about 8 inches. In yet another example, body 12 has a diameter of about 3.5 inches and a length of about 12 inches. In another example, body 12 has a diameter of about 7 inches and a length of about 18 inches. In another example, body 12 has a diameter of about 7 inches and a length of about 36 inches. Similar as discussed above, the plurality of shaped projections 14 have a predetermined shaped as discussed above with reference to FIGS. 1-10 and preferably radially extend about ⅛ inch to about 3 inches from body 12. FIG. 10 shows an example of device 10, indicated at 45. In this example, device 10 may include about seven projections with a curved shape as shown, although device 10 may have any number of projections of various shapes, discussed above, depending on the therapeutic use of device 10.

In the examples above, one or more of the predetermined density and the predetermined diameter in combination with the predetermined shape of the projections effectively mobilize soft tissue structures of the human body. In other examples, one or more of the predetermined density and predetermined diameter in combination with the predetermined shape of the projections may be chosen to effectively optimize body core strength and optimize balance training and/or efficiently break up collagenous fibers of soft tissue structures and/or enhance flexibility of soft tissue structures and/or enhance distensibility of soft tissue structures. Moreover, projections 14 stabilize device 10 when used for body core strength and balance training.

Figure 11A:
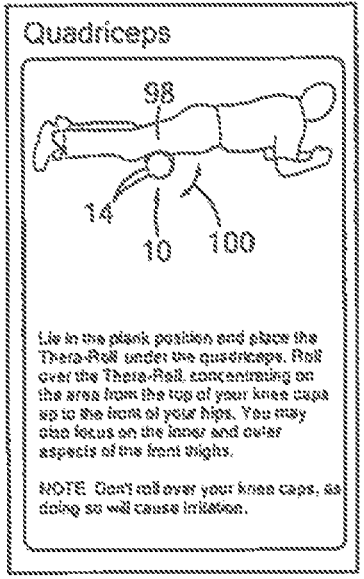
FIGS. 11A-11C and 11E-11M are three-dimensional views showing examples of one embodiment of the therapeutic, fitness, and sports enhancement device shown in FIGS. 1-3 and 10 used to mobilize exemplary soft tissue structures of the human body in accordance with this invention.

Examples of the operation of therapeutic, fitness and sports enhancement device 10 with projections 14 of one or more embodiments of this invention used to mobilize soft tissue structures of the human body and/or effectively optimize body core strength and optimize balance training and/or efficiently break up collagenous fibers of soft tissue structures and/or enhance flexibility of soft tissue structures and/or enhance distensibility of soft tissue structures are shown in FIGS. 11A-11M. For example, FIG. 11A shows an example of device 10 being used to mobilize the soft tissue of Quadriceps 98. When moved back and forth in direction 100, projections 14 extend into the soft tissue of Quadriceps 98 and mobilize Quadriceps 98. This breaks up the collagenous fibers of the Quadriceps 98, enhances flexibility and enhances distensibility of Quadriceps 98.

Figure 11B:
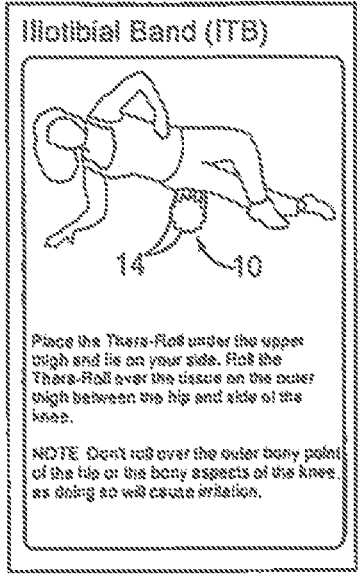
Figure 11C:
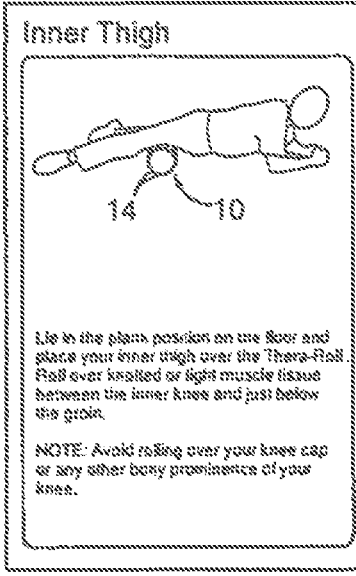
Figure 11E:
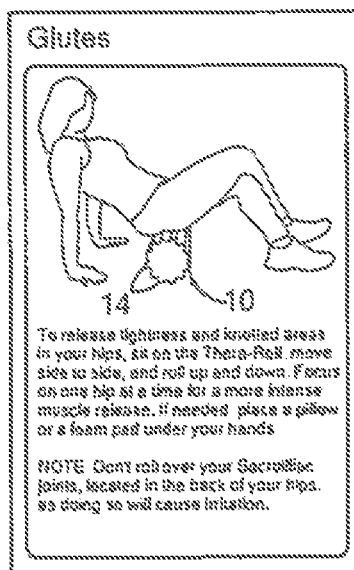
Figure 11F:
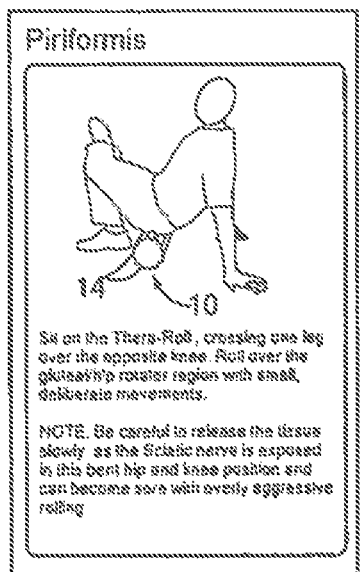
Figure 11G:
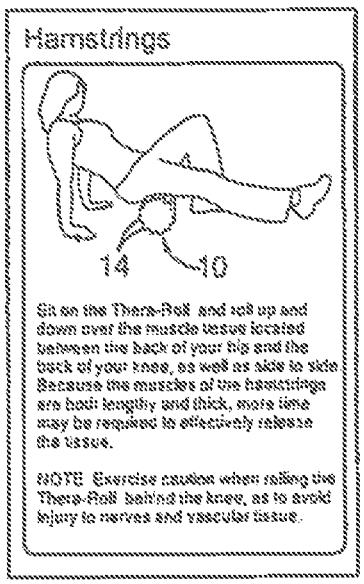
Figure 11H:
Figure 11I:
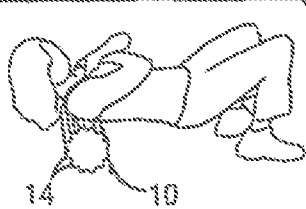
Figure 11J:
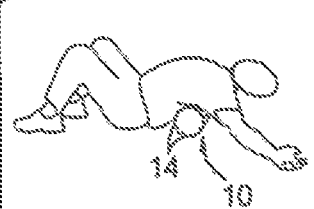
Figure 11K:
Figure 11L:
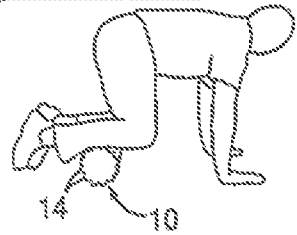
Figure 11M:
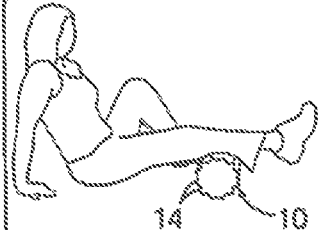

In other examples, therapeutic, fitness, and sports enhancement device 10 may be used in a similar manner as discussed above with reference to FIG. 11A to mobilize soft tissue structures of the liotibial band (ITB), as shown in FIG. 11B, the inner thigh, as shown in FIG. 11C, the Glutes, as shown in FIG. 11E, the Piriformis, as shown in FIG. 11F, the Hamstrings, as shown in FIG. 10G, the Lumbar region, as shown in FIG. 11H, the Rhomboids, as shown in FIG. 11I, the Thoracic region (Mid/Lower Back), as shown in FIGS. 11J and 11K, the Shins, as shown in FIG. 11L, and the calf, as shown in FIG. 11M.

Figure 12A:
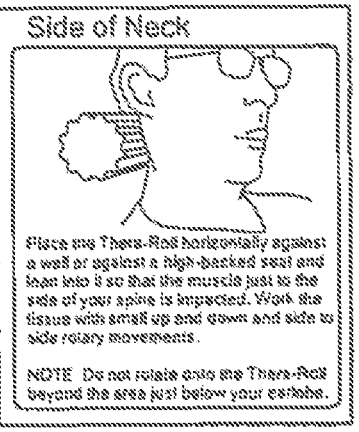
FIG. 12A-12I are three-dimensional views showing examples of another embodiment of the therapeutic, fitness, and sports enhancement device shown in FIGS. 1-3 and 10 used to mobilize different exemplary soft tissue structures of the human body in accordance with this invention.
Figure 12B:
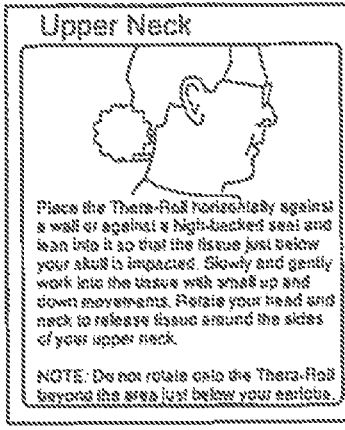
Figure 12C:
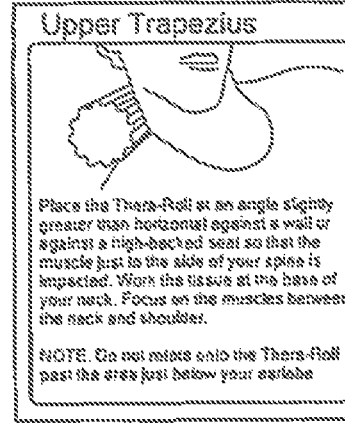
Figure 12D:
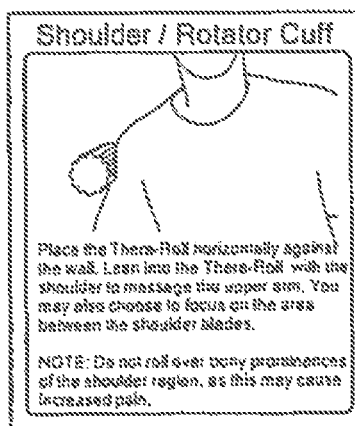
Figure 12E:
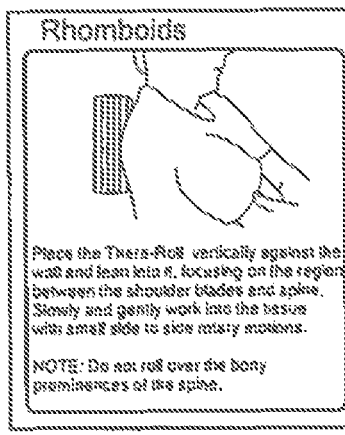
Figure 12F:
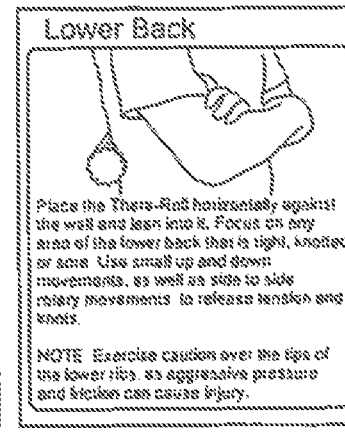
Figure 12G:
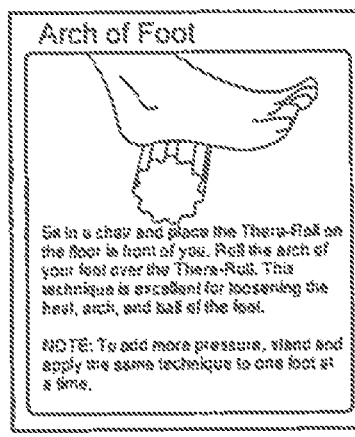
Figure 12H:
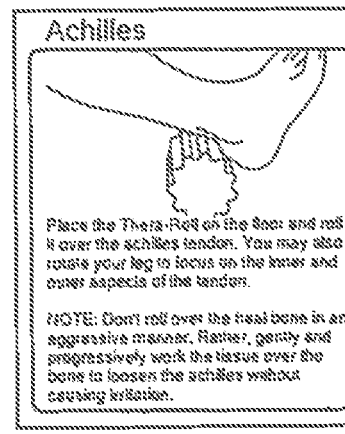
Figure 12I:
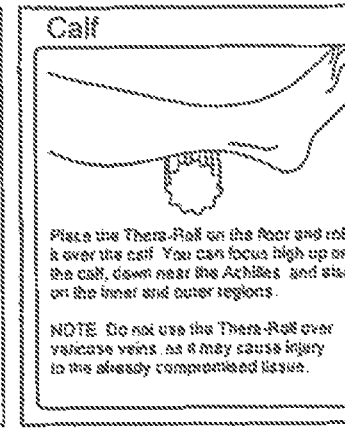

Examples of the operation of "firm" and/or "hard" therapeutic, fitness, and sports enhancement device 10 used to mobilize soft tissue structures of the human body, break up collagenous fibers and/or enhance flexibility and/or enhance distensibility are shown in FIGS. 12A-12I. For example, device 10 may be used to effectively mobilize soft tissue, break up collagenous fibers and/or enhance flexibility and distensibility of the Neck, as shown in FIG. 12A, the upper Neck, as shown in FIG. 12B, the upper Trapezius, as shown in FIG. 12C, the shoulder and Rotator cuff, as shown in FIG. 12D, the Rhomboids, as shown in FIG. 12E, the Lower Back, as shown in FIG. 12F, the arch of the foot, as shown in FIG. 12G, the Achilles, as shown in FIG. 12H, and the Calf, as shown in FIG. 12I.

The result is therapeutic, fitness and sports enhancement device 10 with a unique combination of one or more of density and diameter and the shape of projections 14 maximizes mobilization of soft tissue structures. Typical target soft tissue mobilized by the plurality of shaped projections 14 may include muscles, tendons, ligaments fascia of the human body and the like. Mobilization of soft tissue by projections 14 massages soft tissue and breaks up scar tissue. This increases flexibility of soft tissue, decreases muscle soreness, relieves joint stress, decreases neuromuscular hypertonicity, increases joint range motion and extensibility of musculotendinous junctions, optimizes soft tissue distensibility, increases neuromuscular efficiency, increases flexibility and helps maintain normal functional muscle length. These benefits enhance recovery of injuries when used as a therapeutic tool, maximize sports performance, and improved fitness. Device 10 also optimizes body core strength and optimizes balance training.

In one example, therapeutic fitness and sports enhancement device 10, FIGS. 1-12I may be manufactured using extrusion process as know by those skilled in the art. In this example, raw material in the form of granules of plastic, e.g., polyethylene, is put hopper 150, FIG. 13, and fed into heated chamber 152. Press 154 pushes the material in chamber 152 through die 156. Die plate has the shape of body 12 with projections 14. In this example, die 14 has a shape similar to body 12, FIGS. 1-3, with rounded projections 14. In other examples, die 156 can be shaped with any configuration to manufacture device 10 with the projections shaped as shown in FIGS. 1-9B, or any other various shape known by those skilled in the art. The extruded material is then allowed to cure in a controlled temperature room to strengthen the material and provide a more finished look to device 10.

Figure 14:
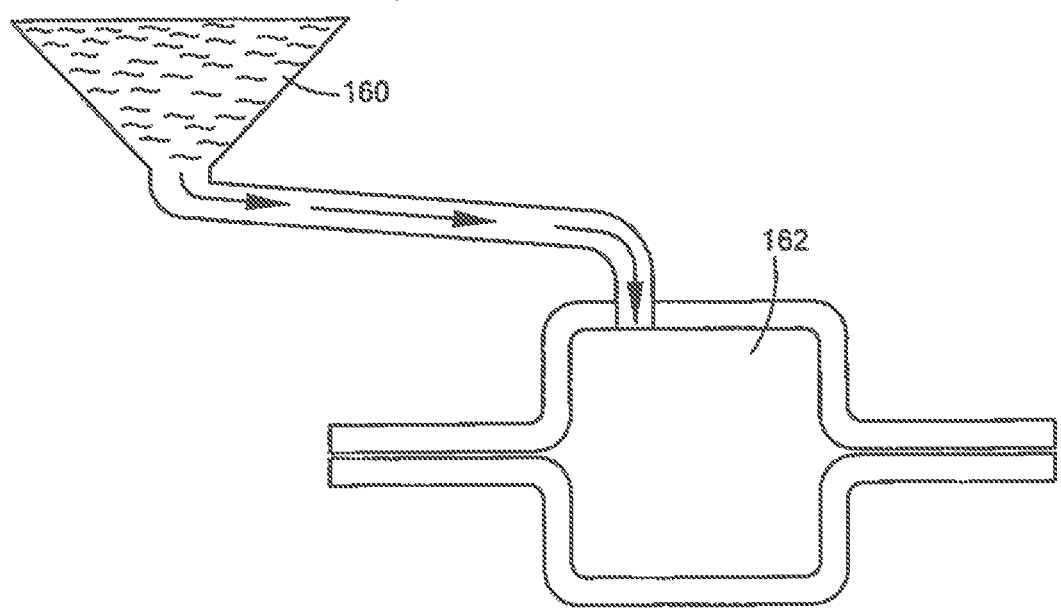
FIG. 14 is a schematic side-view showing one example of a molding process which may be used to manufacture the therapeutic, fitness, and sports enhancement device shown in FIGS. 1-10.

In another example, therapeutic fitness and sports enhancement device 10, FIGS. 1-12I may be manufactured using molding process, as known to those skilled in the art. In this example, raw material, e.g., beads of expandable polyethylene (EPE), is put into a hopper 160, FIG. 14, and then fed into chamber 162 which includes a die in the shape of device 10, FIGS. 1-12I. The chamber is heated and chamber 162 is pressurized. This allows the beads of EPE to shape to the contours of the die. Then a curing phase occurs to allow the EPE form the shape of device 10, e.g., as shown in FIGS. 1-9B. This curing phase occurs in a heated room to allow the polymer to cure.

In another example, therapeutic fitness and sports enhancement device 10, may be manufactured with a large sheet of the pliable material is cut using a high speed vertical band saw which forms cylindrically shaped body 12 and the plurality of shaped projections 14 thereon.

Figure 15:
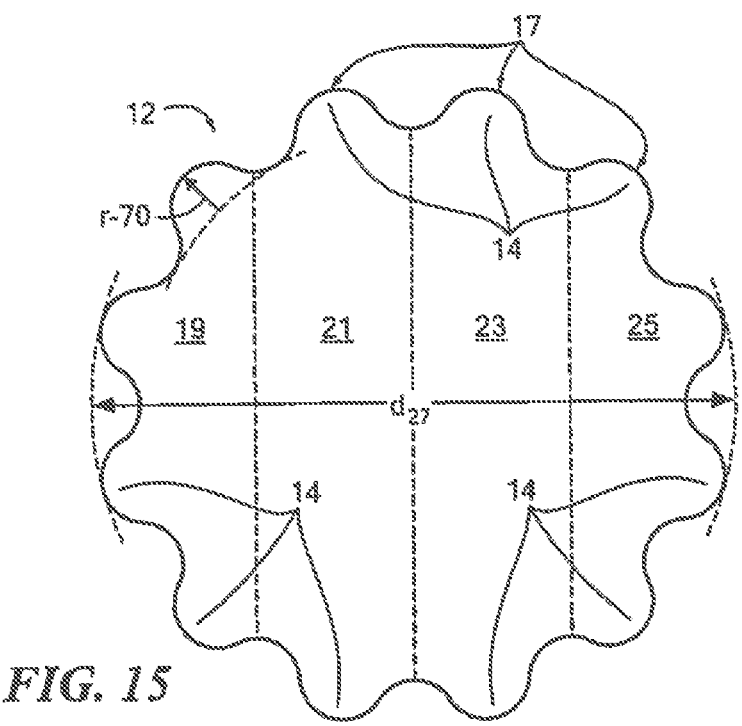
FIG. 15 is a schematic end-view showing one example of a plurality of bands which may be used to manufacture one embodiment of the therapeutic, fitness, and sports enhancement device of this invention.

In yet another example, device 10 may include cylindrically shaped body 12, FIG. 15 that includes a plurality of bonded sections, e.g., sections 19, 21, 23, and 25, each having a plurality of shaped projections 14 thereon of a predetermined type, e.g., as shown in any of FIGS. 1-9B. Each of sections 19-25, FIG. 15, is similarly made of a pliable material, e.g., closed-cell polyethylene foam, such as MINICEL® L200, L300 or L380 discussed above, and is bonded to each other using a high bonding adhesive. The sheets of the pliable material used for the plurality of bonded sections, e.g., sections 19-25, typically has predetermined width, e.g., about 2 inches to 3 inches, or up to 4 inches, although the sheets of pliable material and the resulting width of sections 19-25 may have any width as known to those skilled in the art. The shape of the plurality of shaped projections 16 and cylindrically shaped body 12 made of sections 19-25 is similarly formed using a high speed versatile band saw, as discussed above.

Figure 16:
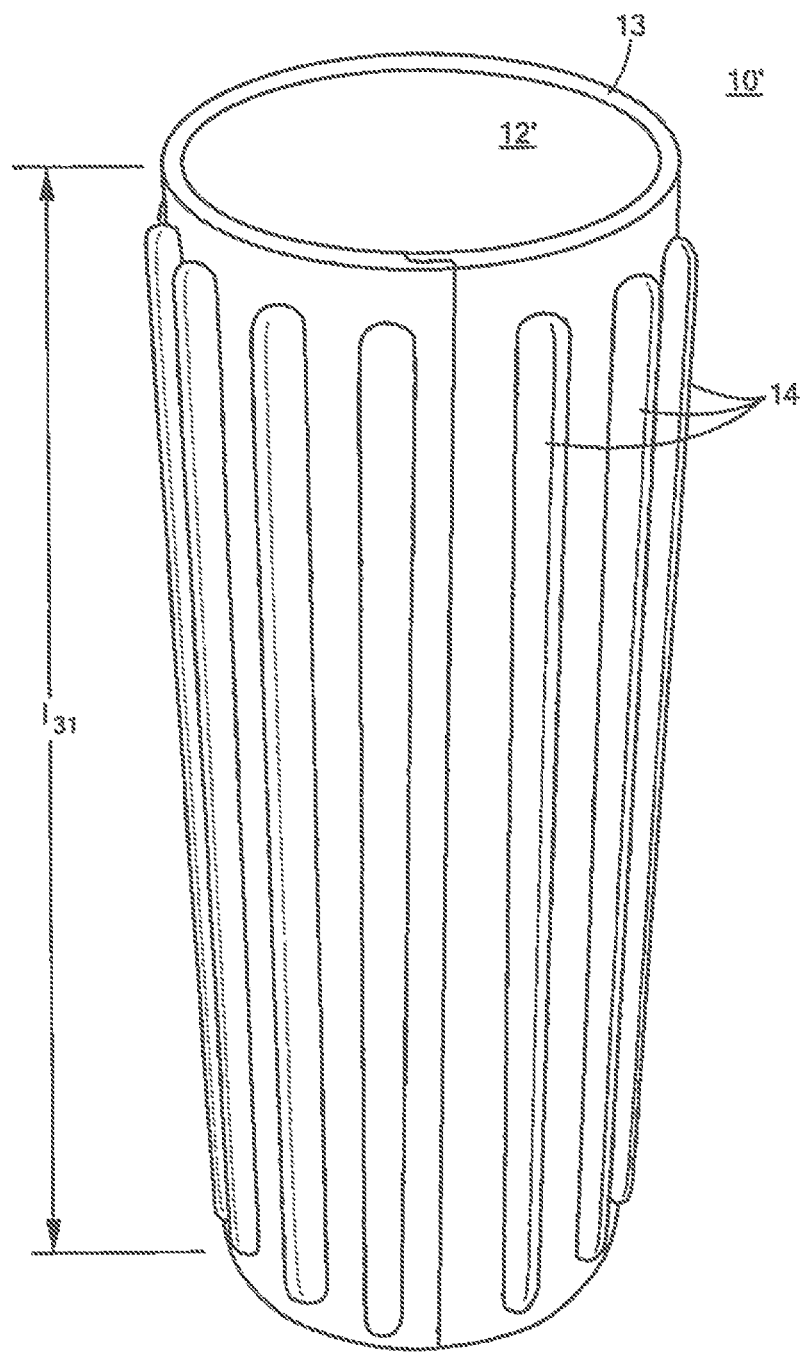
FIG. 16 is a three-dimensional perspective side-view of another embodiment of the therapeutic, fitness, and sports enhancement device of this invention.
Figure 17:
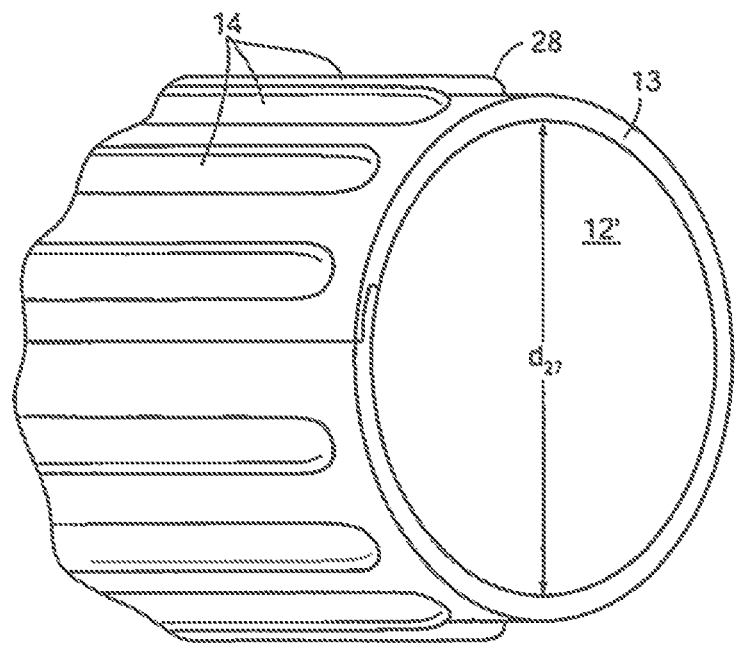
FIG. 17 is a three-dimensional perspective end-view of the therapeutic, fitness, and sports enhancement device shown in FIG. 16.

In another embodiment, therapeutic, fitness, and sports enhancement device 10', FIG. 16, of this invention includes cylindrically shaped core 12 and overlay 13 about core 12. Similar as discussed above, one or more of the predetermined density and the predetermined diameter of body 12 and overlay 13 in combination with the shape of the projections are chosen to effectively mobilize soft tissue structures of the human body. Overlay 13 includes a plurality of shaped projections 14, similar as discussed above with reference to FIGS. 1-9B, which are shaped to mobilize soft tissue structures of the human body and/or improve body core strength and balance training and/or enhance flexibility and/or optimize soft tissue distensibility. Core 12 is similarly made of pliable material, as discussed above. Overlay 13 is typically made of MINICEL® L200, L300 or L380. Body 12 and overlay 13 with projections 14 thereon may also be formed from an extrusion process or a die cast process or cut by a high speed foam band saw, as known to those skilled in the art. Similar as discussed above with reference to FIG. 2, projections 14 on overlay 13, FIG. 16, radially extends about ⅛ inches to about 3 inches from overlay 13, e.g., as indicated at r-70, FIG. 2, as needed to maximize soft tissue mobilization, and improve balance and core strength training, enhance flexibility and optimize soft tissue distensibility. Therapeutic, fitness, and sports enhancement device preferably has a density and d10' may have a length as indicated by l-31, FIG. 16, and has a diameter, d-27, FIG. 17, similar to any of the embodiment of device 10 discussed above with reference to FIGS. 1-9B.

Figure 18:
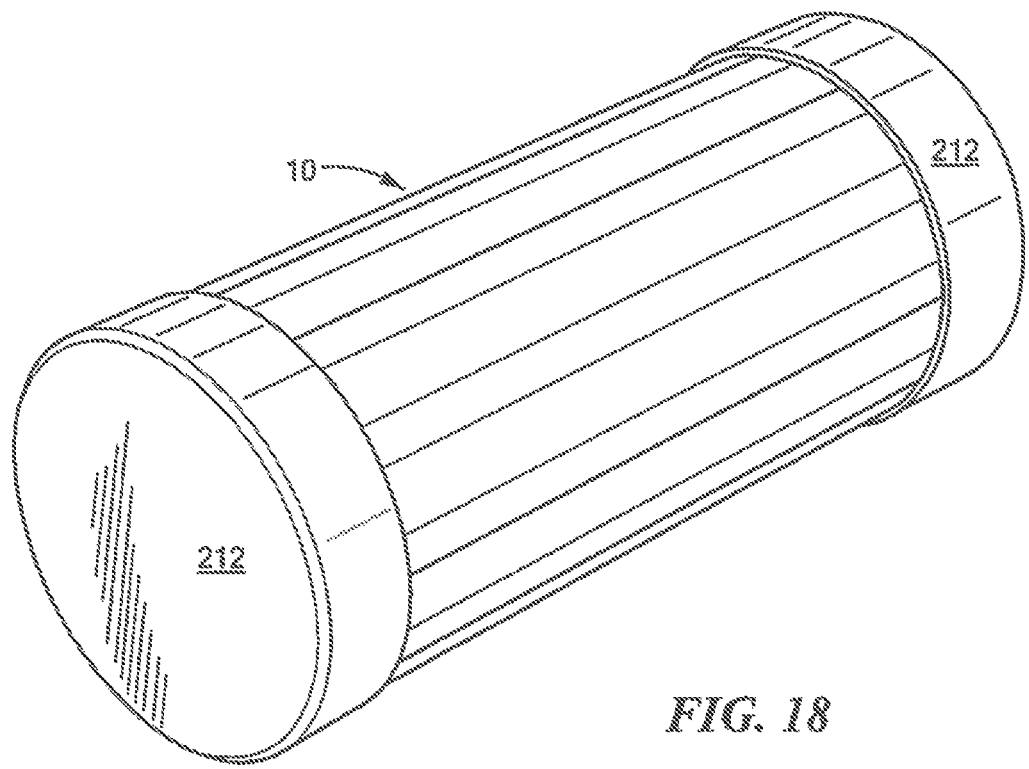
FIG. 18 is a three-dimensional perspective side-view showing one example of end caps which may be utilized with the therapeutic, fitness, and sports enhancement device shown in FIGS. 1-16 of this invention.

In one embodiment, therapeutic, fitness, and sports enhancement device 10, FIGS. 1-16, may include end caps 212, FIG. 18, on each end of device 10.

Figure 19A:
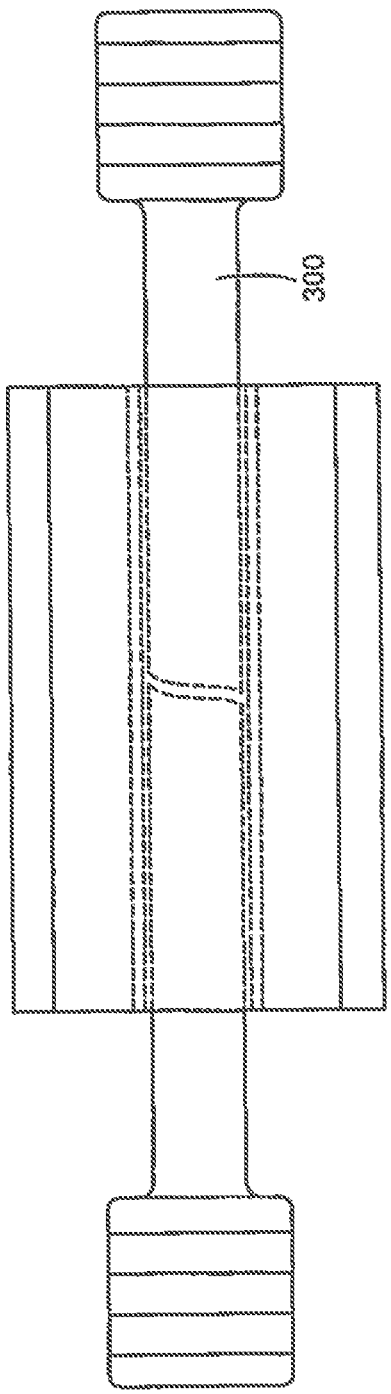
FIG. 19A is a schematic side-view showing one embodiment of the therapeutic, fitness, and sports enhancement device of this invention with a handle.
Figure 19B:
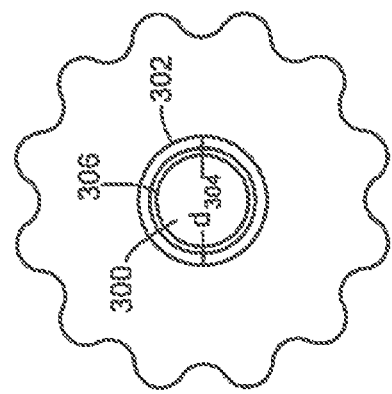
FIG. 19B is a schematic end-view of the therapeutic, fitness, and sports enhancement device shown in FIG. 18A.
Figure 19C:
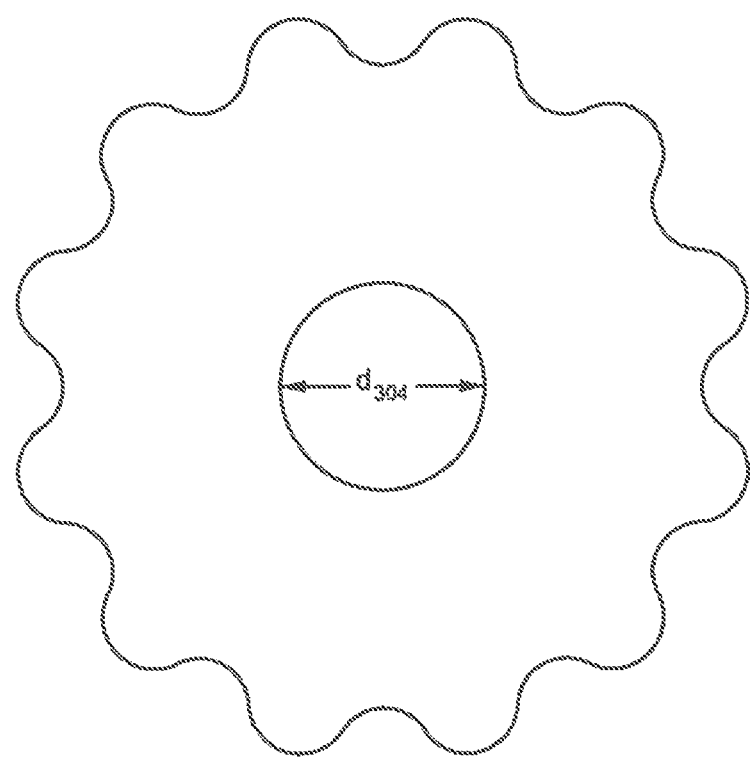
FIG. 19C is another schematic end-view of the therapeutic, fitness, and sports enhancement device shown in FIG. 18A.

Therapeutic, fitness, and sports enhancement device 10, FIGS. 1-18, may also include handle 300, FIG. 19A. Handle 300 preferably extends though opening 302, FIG. 19B, having inner diameter d-304, which can vary from about ¼ inch to about 5 inches, e.g., about 2 inches as shown in FIG. 19C. Opening 302, FIG. 19B, with inner diameter d-304 is typically created using an extrusion process. Inner sleeve 306 fits inside opening 302 and handle 300 extends through inner sleeve 306. Handle 300 may be used for gripping to allow the ridged roll to roll over the soft tissue of the body, e.g., the Quadriceps, Upper Trapezius, Iliotibial band, and the like, as discussed above with reference to FIGS. 11A-12I.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A soft tissue mobilization device comprising:
   a cylindrical core made of closed cell foam, rubber or plastic, having a first end and a second end;
   an overlay surrounding the core from about the first end to about the second end in which the core provides resistance to compression for the overlay, the overlay made of closed cell foam, rubber or plastic; said overlay comprising projections configured to extend into soft tissue while under pressure of the user's body, wherein the device has a diameter of about 3 inches to about 15 inches; wherein the soft tissue into which the projection is configured to extend is fascia, muscle, tendon, ligament, or a combination of two or more of the foregoing.

2. The device of claim 1 in which the projections have a shape including one of: a rounded shape, a curved shape, a triangle shape, a square shape, a notch shape, a cylindrical shape with rounded ends, or a cylindrical shape with flat ends.

3. The device of claim 1 in which the projections longitudinally extend over a length of the device.

4. The device of claim 1 in which the projections extend perpendicular to a longitudinal axis of the device.

5. The device of claim 1 in which the projections radially extend from the device at the same angles.

6. The device of claim 1 in which the projections radially extend from the device at different angles.

7. The device of claim 1 in which the projections are configured in a wave pattern extending from the device.

8. The device of claim 1 in which the projections are configured in a Z pattern extending from the device.

9. The device of claim 1 in which the projections are configured in a helical pattern extending from the device.

10. The device of claim 1 in which the projections are individually spaced in a predetermined pattern extending from the device.

11. The device of claim 10 in which the predetermined pattern includes an aligned pattern of the projections extending from the device.

12. The device of claim 10 in which the predetermined pattern includes an offset pattern of the projections extending from the device.

13. The device of claim 1 in which the device is made of a pliable material.

14. The device of claim 13 in which the pliable material includes a closed-cell foam material.

15. The device of claim 14 in which the closed-cell foam material includes a chemically cross-linked polyethylene foam.

16. The device of claim 13 in which the pliable material includes expandable polyethylene.

17. The device of claim 13 in which the pliable material includes plastic.

18. The device of claim 1 in which the device includes a plurality of bonded sections.

19. The device of claim 1 in which the device is manufactured using an extrusion process.

20. The device of claim 1, wherein the soft tissue into which the projection is configured to extend is fascia.

* * * * *